UNITED STATES PATENT OFFICE.

WILLIAM IRVINE, OF MUSKOKA FALLS, ONTARIO, ASSIGNOR OF ONE-HALF TO JOSEPH HARCOURT PARKINSON, OF BRACEBRIDGE, CANADA.

HORSE-COLLAR.

SPECIFICATION forming part of Letters Patent No. 434,277, dated August 12, 1890.

Application filed March 6, 1890. Serial No. 342,857. (No model.)

*To all whom it may concern:*

Be it known that I, WILLIAM IRVINE, harness-maker, of the village of Muskoka Falls, in the district of Muskoka, in the Province of Ontario, Canada, have invented a certain new and useful Improvement in Horse-Collars, of which the following is a specification.

The object of the invention is to design a horse-collar which may be readily adjusted to fit the neck of any horse, and which, when fitted, cannot choke the horse; and it consists in the peculiar construction and combination of parts hereinafter more fully described, and then definitely claimed.

Figure 1:
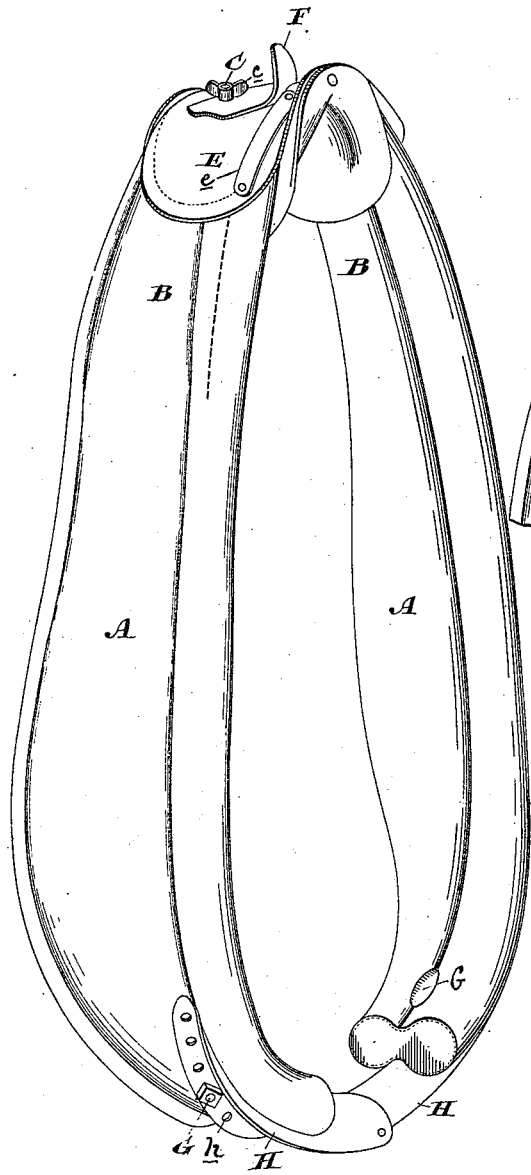
Figure 2:
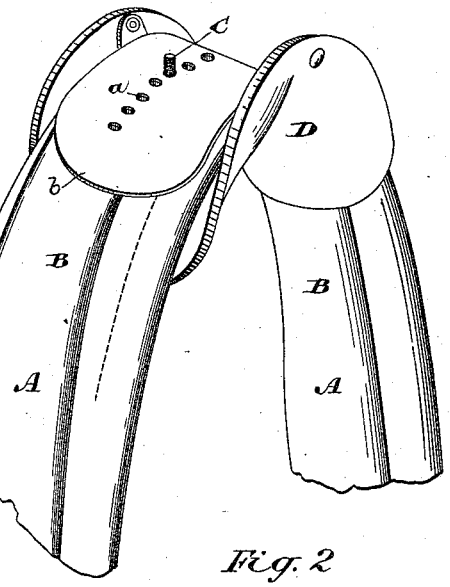
Figure 3:
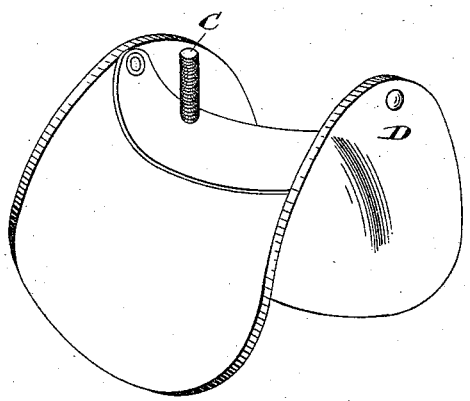

Figure 1 is a perspective view of my improved horse-collar. Fig. 2 is an enlarged detail of the top of the collar with the housing removed. Fig. 3 is a detail of the collar-pad.

In the drawings, A represents the sides of the collar, which are suitably padded and properly stiffened with wood or other suitable material. The upper portion of the sides (marked B) are made flexible, and the joint is covered by flaps $b$, which overlap each other. A row of holes (marked $a$) (see Fig. 2) is made near the ends or flaps of the said sides, so that the said ends may be connected together by the bolt, (marked C.) This bolt is connected to the collar-pad D, which, in addition to passing through the holes $a$ in the flaps $b$, also passes through the housing E and the horn F, and is provided with a wing-nut $c$. A stiffening-piece $e$ is riveted or otherwise fastened to the housing E, which housing completely covers and hides the flaps and the joint between the sides of the collar. The sides A are connected together at the bottom by the hinged throat-piece H, secured by bolts G, the heads of which fit between the rim and body of the collar. A series of holes $h$ are made in the throat-piece H, and holes are made in the sides A to receive the bolts G and enable the said sides A of the collar to be adjusted nearer to or farther from each other to accommodate the size of the neck of the horse the collar is to be worn by. As the throat-piece H does not come in contact with the throat of the horse, the padding on the sides A preventing it, no strain or pressure is directed against the throat; consequently a horse wearing my improved collar cannot be choked.

What I claim as my invention is—

A collar divided at the top, each side provided with a perforated flap $b$, the flap on one side overlapping the one on the other, in combination with the housing E, horn F, the pad D, provided with central bolt C, connected thereto and passing through said flaps, housing, and horn, and a nut $c$, to secure the same together, substantially as described.

Toronto, December 31, 1889.

WILLIAM IRVINE.

In presence of—
CHARLES C. BALDWIN,
W. G. MCMILLAN.

(No Model.)

W. IRVINE.
HORSE COLLAR.

No. 434,277. Patented Aug. 12, 1890.

Witnesses.
F. R. Cameron
W. G. McMillan

Inventor.
William Irvine
by Donald C. Ridout & Co
Attys

THE NORRIS PETERS CO., PHOTO-LITHO., WASHINGTON, D. C.